US012516559B2

(12) United States Patent
Sasaki

(10) Patent No.: US 12,516,559 B2
(45) Date of Patent: Jan. 6, 2026

(54) CHARGING LID STRUCTURE

(71) Applicant: TOYOTA JIDOSHA KABUSHIKI KAISHA, Toyota (JP)

(72) Inventor: Masaru Sasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/822,288

(22) Filed: Sep. 2, 2024

(65) Prior Publication Data

US 2025/0188777 A1 Jun. 12, 2025

(30) Foreign Application Priority Data

Dec. 7, 2023 (JP) ................................ 2023-207160

(51) Int. Cl.

*E05D 5/12* (2006.01)
*E05D 3/02* (2006.01)
*E05D 7/10* (2006.01)

(52) U.S. Cl.

CPC ........... *E05D 5/128* (2013.01); *E05D 7/1005* (2013.01); *E05D 3/02* (2013.01); *E05D 2007/1027* (2013.01); *E05Y 2900/534* (2013.01)

(58) Field of Classification Search

CPC .................. E05D 5/128; E05D 7/1005; E05D 2007/1027; E05D 11/10; E05D 11/1007; E05D 11/1014; E05D 11/105; E05D 11/0018; E05D 11/0027; E05D 2011/0045; E05Y 2900/534; E05B 83/34; B60K 15/05; B60K 2015/053; B60K 2015/0584

See application file for complete search history.

(56) References Cited

U.S. PATENT DOCUMENTS 2,057,269 A * 10/1936 Schreiber .............. E05D 7/1005 16/263
3,621,512 A * 11/1971 Johnson .................. E05D 5/128 16/380
4,190,929 A * 3/1980 Palka .................... E05D 7/1022 16/DIG. 13
4,561,147 A * 12/1985 Katoh ....................... E05D 5/12 16/277

(Continued)

FOREIGN PATENT DOCUMENTS

JP 7207563 B2 1/2023
WO 2021/070284 A1 4/2021

*Primary Examiner* — Jeffrey O'Brien

(74) *Attorney, Agent, or Firm* — SoraIP, Inc.

(57) ABSTRACT

The charging lid structure includes a charging lid having a lid-side bearing portion provided on a lid-side hinge portion engaged with the main body side and having a lid-side bearing portion in which a lid-side pin hole is formed on a side surface, a body side hinge portion having a main body-side bearing portion in which a main body-side pin hole communicating with the lid-side pin hole is formed on a side surface, a rotary shaft in which a shaft-side pin hole communicating with the lid-side pin hole is formed in the shaft portion, and the shaft portion is inserted into the lid-side bearing portion and the main body-side bearing portion, and rotatably supports the lid-side hinge portion and the body side hinge portion, and a fixing pin that can be inserted into and removed from the main body-side pin hole, the lid-side pin hole, and the shaft-side pin hole.

2 Claims, 2 Drawing Sheets

(56) References Cited

U.S. PATENT DOCUMENTS

| | | | | |
|---|---|---|---|---|
| 5,966,778 | A * | 10/1999 | Ray | E05D 11/082 16/338 |
| 6,725,504 | B1 * | 4/2004 | Dickson | E05D 7/04 200/61.7 |
| 7,162,774 | B1 * | 1/2007 | Von Resch | E05D 7/0054 16/236 |
| 7,278,183 | B2 * | 10/2007 | Schluter | E05D 5/121 16/262 |
| 7,325,276 | B2 * | 2/2008 | Kim | E05D 5/128 16/262 |
| 9,194,166 | B1 * | 11/2015 | Spiegel | E05D 3/02 |
| 9,227,509 | B1 * | 1/2016 | Jones | B60K 15/05 |
| 10,550,615 | B2 * | 2/2020 | Cherry | E05D 7/1005 |
| 10,753,132 | B2 * | 8/2020 | Roberts | E05D 11/06 |
| 11,059,376 | B2 * | 7/2021 | Sasaki | B60K 15/04 |
| 11,673,466 | B2 * | 6/2023 | Sha | E05B 81/36 49/281 |
| 11,767,693 | B2 * | 9/2023 | Maeda | E05B 83/34 292/137 |
| 11,913,264 | B2 * | 2/2024 | Sun | E05B 81/30 |
| 11,927,042 | B2 * | 3/2024 | Brewster | B64C 1/1469 |
| 12,054,975 | B2 * | 8/2024 | Sampson | E05D 5/128 |
| 12,146,358 | B2 * | 11/2024 | Mensch | E05F 1/10 |
| 12,258,805 | B2 * | 3/2025 | Hofmann | E05D 7/0423 |
| 2008/0083088 | A1 * | 4/2008 | Lin | E05D 11/1064 16/327 |
| 2010/0095481 | A1 * | 4/2010 | Stefka | E05D 11/1007 16/231 |
| 2013/0219664 | A1 * | 8/2013 | Burda | E05D 11/06 16/374 |
| 2016/0168893 | A1 * | 6/2016 | Finkelstein | E05D 11/1078 16/264 |
| 2018/0162219 | A1 * | 6/2018 | Lee | B60K 15/05 |
| 2022/0136292 | A1 * | 5/2022 | Sun | E05B 81/18 49/280 |
| 2023/0243203 | A1 * | 8/2023 | Sun | B60Q 1/0035 49/13 |
| 2024/0075824 | A1 * | 3/2024 | Shibata | H01R 13/7172 |
| 2025/0052099 | A1 * | 2/2025 | Sun | E05D 3/145 |
| 2025/0172022 | A1 * | 5/2025 | Tanaka | B60K 15/05 |
| 2025/0187462 | A1 * | 6/2025 | Kim | B60L 53/14 |

* cited by examiner

CHARGING LID STRUCTURE

CROSS-REFERENCE TO RELATED APPLICATION

This application claims priority to Japanese Patent Application No. 2023-207160 filed on Dec. 7, 2023, incorporated herein by reference in its entirety.

BACKGROUND

1. Technical Field

The present disclosure relates to a charging lid structure.

2. Description of Related Art

WO 2021/070284 describes a push latch that allows a lid to be lifted and half-opened by pushing a latch from above the lid and to be fully opened by pulling an edge portion of the lid.

SUMMARY

When it is attempted to charge a vehicle in a place where there is not enough space, a charging lid may stand in the way to hinder charging.

The present disclosure has been made in view of the above, and an object thereof is to provide a charging lid structure that suppresses a charging lid getting in the way during charging.

An aspect of the present disclosure provides a charging lid structure including:

- a charging lid provided on a lid side hinge portion that engages with a body side and including a lid side bearing portion, the lid side bearing portion including a lid side pin hole formed in a side surface of the lid side bearing portion;
- a body side hinge portion including a body side bearing portion including a body side pin hole formed in a side surface of the body side bearing portion and communicating with the lid side pin hole;
- a rotary shaft including a shaft side pin hole formed in a shaft portion of the rotary shaft and communicating with the lid side pin hole, the shaft portion being insertable into the lid side bearing portion and the body side bearing portion to rotatably support the lid side hinge portion and the body side hinge portion; and
- a fixing pin that is insertable into and removable from the body side pin hole, the lid side pin hole, and the shaft side pin hole.

According to the present disclosure, it is possible to implement a charging lid structure that suppresses a charging lid getting in the way during charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A charging lid structure according to an embodiment of the present disclosure will be described with reference to the drawings. Incidentally, the constituent elements in the following embodiments include those that can be easily replaced by a person skilled in the art or those that are substantially the same.

EMBODIMENTS

Figure 1:
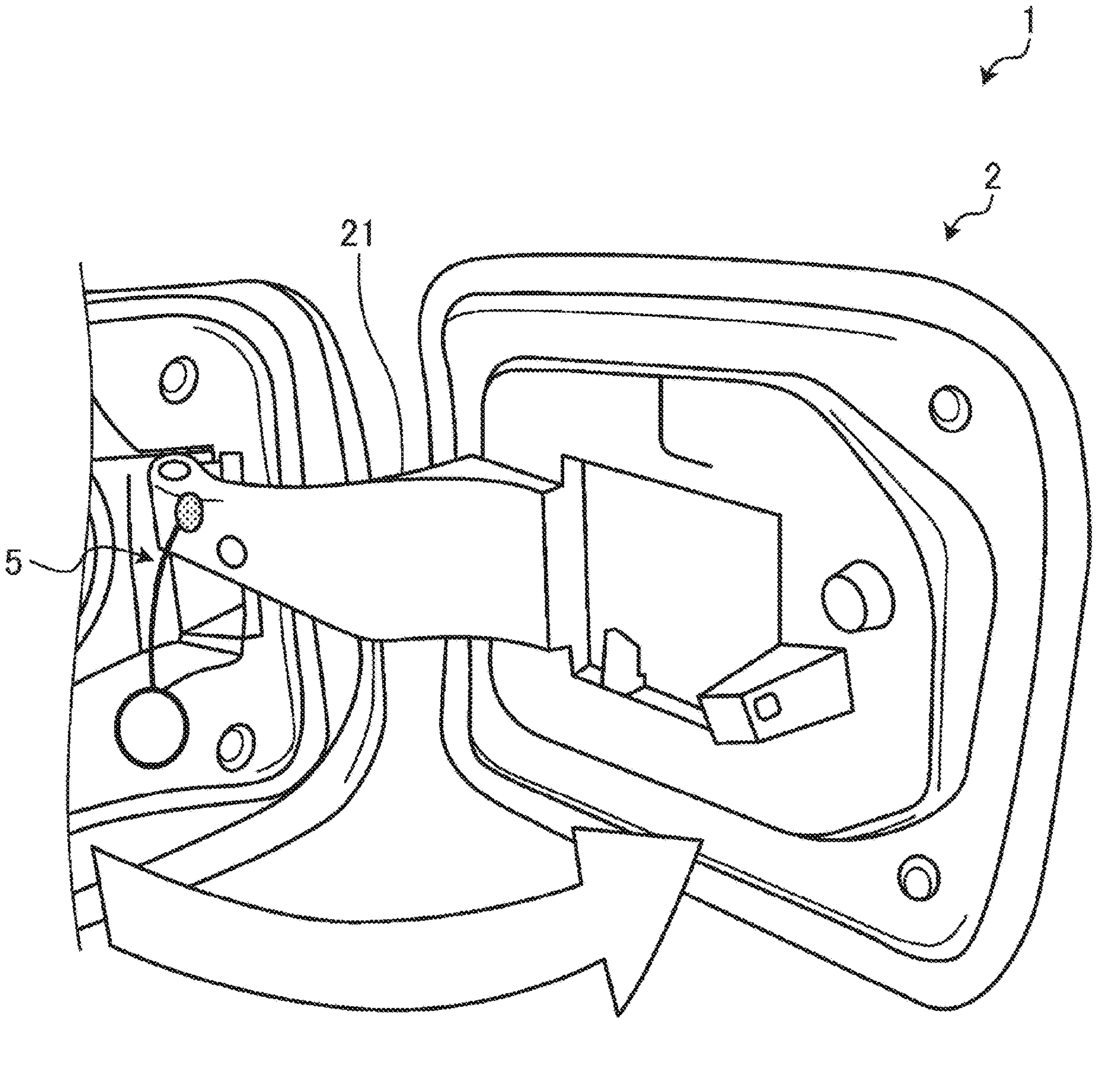
FIG. 1 is a schematic configuration diagram of a charging lid structure according to an embodiment.

FIG. 1 is a schematic configuration diagram of a charging lid structure according to an embodiment. As shown in FIG. 1, the charging lid structure 1 protects the charging inlet by means of an openable and closable charging lid 2. The charging lid 2 is provided in a quarter or fender of a vehicle having a charging inlet such as BEV (Battery Electric Vehicle) or PHEV (Plug-in Hybrid Electric Vehicle). The size of the charging lid 2 is defined in accordance with the size of the charging inlet, the working space, and the like. When DC quick charging function is provided, the size of the charging lid 2 increases.

Figure 2:
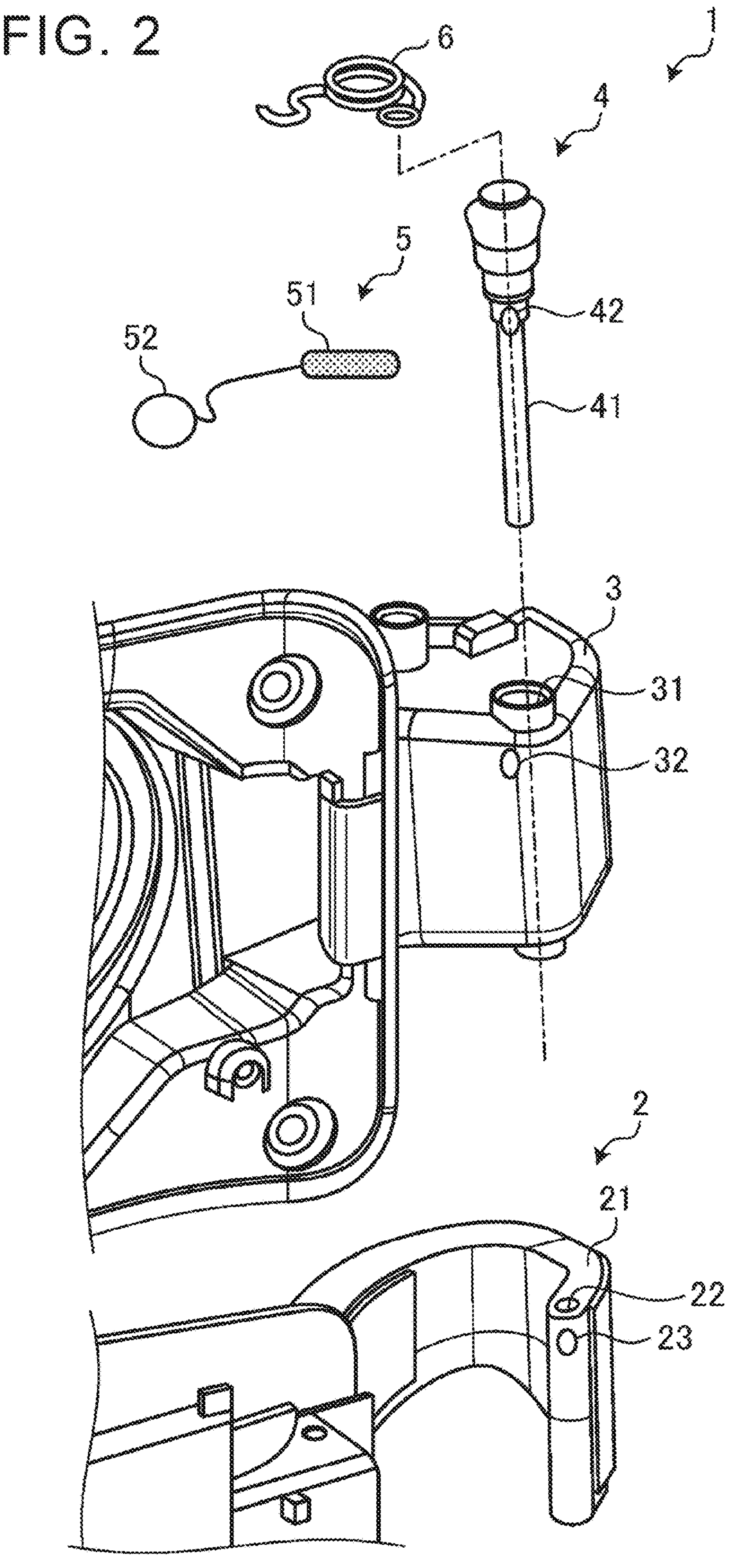
FIG. 2 is an exploded view of the charging lid structure shown in FIG. 1.

FIG. 2 is an exploded view of the charging lid structure shown in FIG. 1. As illustrated in FIG. 2, the charging lid structure 1 includes a charging lid 2, a body side hinge portion 3, a rotary shaft 4, a fixing pin 5, and a spring 6.

The charging lid 2 includes a lid-side hinge portion 21 that engages with the main body side. The charging lid 2 has a lid-side bearing portion 22 provided at the distal end of the lid-side hinge portion 21. The lid-side bearing portion 22 has a cylindrical shape, and the shaft portion 41 is inserted therein. A lid-side pin hole 23 is formed in a side surface of the lid-side bearing portion 22.

The body side hinge portion 3 has a main body side bearing portion 31. The main body side bearing portion 31 has a cylindrical shape, and the shaft portion 41 is inserted therein. A body-side pin hole 32 communicating with the lid-side pin hole 23 is formed in a side surface of the body-side bearing portion 31.

The rotary shaft 4 has a shaft portion 41. The shaft portion 41 is inserted into the lid-side bearing portion 22 and the body-side bearing portion 31, and rotatably supports the lid-side hinge portion 21 and the body side hinge portion 3. A shaft-side pin hole 42 communicating with the lid-side pin hole 23 is formed in the shaft portion 41.

The fixing pin 5 can be inserted into and removed from the main body-side pin hole 32, the lid-side pin hole 23, and the shaft-side pin hole 42. The fixing pin 5 includes a body-side pin hole 32, a lid-side pin hole 23, a rod-shaped insertion portion 51 to be inserted into the shaft-side pin hole 42, and a ring-shaped operation string 52 capable of performing an operation of pulling out the insertion portion 51 by hooking a finger.

The spring 6 biases the charging lid 2 in a direction in which the charging lid 2 opens.

According to the charging lid structure 1 described above, the charging lid 2 can be removed by hooking a finger on the operation string 52 and pulling out the insertion portion 51 from the main body side pin hole 32, the lid side pin hole 23, and the shaft side pin hole 42. As a result, even when charging is performed in a narrow parking lot, the charging lid 2 is prevented from becoming an obstacle during charging.

In particular, when charging is performed in a narrow multi-story parking lot, the sensor of the parking lot reacts to the charging lid in the open state. Therefore, there are cases where the garage cannot be moved or charged in the multi-story parking lot. However, according to the charging lid structure 1, since the charging lid 2 can be removed, charging can be performed.

In addition, although the charging lid can be made of a sliding type, since the configuration of the sliding type is greatly changed from the conventional opening and closing type, it is expensive to modify the production line. On the other hand, according to the charging lid structure 1, since the conventional opening/closing type is adopted, the configuration change is minimized and the cost is not increased.

Further advantages and variations can be readily derived by one of ordinary skill in the art. Thus, the broader aspects of the disclosure are not limited to the specific details and representative embodiments presented and described above. Accordingly, various modifications may be made without departing from the spirit or scope of the general inventive concept as defined by the appended claims and their equivalents.

What is claimed is:

1. A charging lid structure comprising:

a charging lid provided on a lid side hinge portion that engages with a body side and including a lid side bearing portion, the lid side bearing portion including a lid side pin hole formed in a side surface of the lid side bearing portion;

a body side hinge portion including a body side bearing portion including a body side pin hole formed in a side surface of the body side bearing portion and communicating with the lid side pin hole;

a rotary shaft including a shaft side pin hole formed in a shaft portion of the rotary shaft and communicating with the lid side pin hole, the shaft portion being insertable into the lid side bearing portion and the body side bearing portion to rotatably support the lid side hinge portion and the body side hinge portion; and a fixing pin that is insertable into and removable from the body side pin hole, the lid side pin hole, and the shaft side pin hole.

2. The charging lid structure according to claim 1, wherein the fixing pin includes:

an insertion portion to be inserted into the body side pin hole, the lid side pin hole, and the shaft side pin hole; and an operation string that enables the insertion portion to be pulled out by engaging a finger with the operation string.

* * * * *